(12) United States Patent
Bernardo et al.

(10) Patent No.: US 11,804,619 B2
(45) Date of Patent: Oct. 31, 2023

(54) SOLID POLYMER ELECTROLYTE INCLUDING SOLVATING POLYMER, LITHIUM SALT, AND PVDF-HFP COPOLYMER AND BATTERY INCLUDING SAME

(71) Applicant: BLUE SOLUTIONS, Ergue Gaberic (FR)

(72) Inventors: Philippe Bernardo, Quimper (FR); Vincent Bodenez, Saint Yvi (FR); Marc Deschamps, Quimper (FR); Mathieu Dru, Briec (FR); Margaud Lecuyer, Combrit (FR)

(73) Assignee: BLUE SOLUTIONS, Ergue Gaberic (FR)

( * ) Notice: Subject to any disclaimer, the term of this patent is extended or adjusted under 35 U.S.C. 154(b) by 279 days.

(21) Appl. No.: 16/646,740

(22) PCT Filed: Sep. 17, 2018

(86) PCT No.: PCT/FR2018/052270
§ 371 (c)(1),
(2) Date: Mar. 12, 2020

(87) PCT Pub. No.: WO2019/053388
PCT Pub. Date: Mar. 21, 2019

(65) Prior Publication Data
US 2020/0280094 A1    Sep. 3, 2020

(30) Foreign Application Priority Data

Sep. 18, 2017 (FR) .................................... 17 58601

(51) Int. Cl.
| | | |
|---|---|---|
| *H01M 10/0565* | (2010.01) | |
| *H01M 10/0525* | (2010.01) | |
| *H01M 50/414* | (2021.01) | |
| *H01M 50/426* | (2021.01) | |
| *H01M 50/489* | (2021.01) | |
| *H01M 4/02* | (2006.01) | |

(52) U.S. Cl.
CPC ... *H01M 10/0565* (2013.01); *H01M 10/0525* (2013.01); *H01M 50/414* (2021.01); *H01M 50/426* (2021.01); *H01M 50/489* (2021.01); *H01M 2004/027* (2013.01); *H01M 2004/028* (2013.01); *H01M 2300/0082* (2013.01)

(58) Field of Classification Search
CPC ......... H01M 10/0565; H01M 10/0525; H01M 2004/027; H01M 2004/028
USPC ...................................................... 429/303
See application file for complete search history.

(56) References Cited

U.S. PATENT DOCUMENTS

| | | | |
|---|---|---|---|
| 6,521,382 B1 * | 2/2003 | Song ................ | H01M 10/0565 429/316 |
| 2004/0188880 A1 * | 9/2004 | Bauer ................ | H01M 4/139 264/109 |
| 2005/0238962 A1 * | 10/2005 | Noh .................. | H01M 50/411 429/251 |
| 2006/0286446 A1 * | 12/2006 | Chun ................ | H01M 50/489 429/251 |
| 2009/0104537 A1 | 4/2009 | Deschamps | |
| 2009/0162754 A1 | 6/2009 | Cotton et al. | |
| 2009/0286163 A1 * | 11/2009 | Shin ................. | H01M 10/0569 429/231.95 |
| 2012/0094187 A1 | 4/2012 | Kwon et al. | |
| 2015/0132638 A1 * | 5/2015 | Adachi ............. | H01M 10/056 429/189 |
| 2015/0311491 A1 * | 10/2015 | Deschamps ...... | H01M 50/411 429/152 |
| 2015/0364773 A1 | 12/2015 | Tamirisa et al. | |
| 2017/0141397 A1 * | 5/2017 | Lecuyer ........... | H01M 10/0569 |
| 2019/0348711 A1 * | 11/2019 | Watanabe ......... | C09D 127/16 |
| 2021/0057705 A1 * | 2/2021 | Lee .................. | H01M 50/403 |

FOREIGN PATENT DOCUMENTS

| | | | |
|---|---|---|---|
| CN | 102939681 A | | 2/2013 |
| CN | 106415908 A | | 2/2017 |
| CN | 106654172 A | * | 5/2017 |
| JP | 2001167796 A | | 6/2001 |
| JP | 2011022271 A | * | 2/2011 |
| JP | 2011191089 A | * | 9/2011 |
| JP | 2011209184 A | * | 10/2011 |
| JP | 2012058681 A | * | 3/2012 |
| JP | 2012063216 A | * | 3/2012 |
| JP | 2012163506 A | * | 8/2012 |
| JP | 2012177888 A | * | 9/2012 |
| JP | 2012177889 A | * | 9/2012 |
| JP | 2012181494 A | * | 9/2012 |
| JP | 2013068567 A | * | 4/2013 |
| JP | 2013178342 A | * | 9/2013 |

(Continued)

OTHER PUBLICATIONS

Arkema, KYNAR FLEX (R) 2801-00 Material Safety Data Sheet, Jan. 7, 2008, (Year: 2008).*
Liao et al., Polypropylene-supported and nano-$Al_2O_3$ doped poly-(ethylene oxide)-poly(vinylidene fluoride-hexafluoropropylene)- based gel electrolyte for lithium ion batteries, 2011, Journal of Power Sources, 196, 2115-2121 (Year: 2011).*
Song et al., Conductivity Study of Porous Plasticized Polymer Electrolytes Based on Poly(vinylidene fluoride), 2000, Journal of The Electrochemical Society, 147, 3219-3225 (Year: 2000).*

(Continued)

*Primary Examiner* — Sean P Cullen
(74) *Attorney, Agent, or Firm* — Greer, Burns & Crain, Ltd

(57) ABSTRACT

The invention relates to a solid polymer electrolyte for a battery comprising at least one polymer which solvates the cations of a lithium salt, at least one lithium salt and at least one specifically selected halogenated polymer, and also to the lithium batteries comprising such a solid polymer electrolyte, in particular LMP batteries.

15 Claims, 1 Drawing Sheet

(56) References Cited

FOREIGN PATENT DOCUMENTS

| JP | 2014130246 A | * | 7/2014 | |
|---|---|---|---|---|
| JP | 2015203854 A | * | 11/2015 | |
| JP | 2016172425 A | * | 9/2016 | |
| JP | 2017132107 A | * | 8/2017 | |
| KR | 100353867 B1 | | 9/2002 | |
| WO | WO-2016009147 A1 | * | 1/2016 | .......... H01M 10/052 |
| WO | WO-2017154449 A1 | * | 9/2017 | ............ C08F 214/22 |

OTHER PUBLICATIONS

Abraham et al., Inorganic-Organic Composite Solid Polymer Electrolytes, 2000, Journal of The Electrochemical Society, 147, 1251-1256 (Year: 2000).*

Abraham et al., Highly Conductive PEO-like Polymer Electrolytes, 1997, Chemistry of Materials, Sep. 1978-1988 (Year: 1997).*

Abraham et al., PEO-Like Polymer Electrolytes with High Room Temperature Conductivity, 1997, Journal of The Electrochemical Society, 144, L136-L138 (Year: 1997).*

"Oligomer." New Oxford American Dictionary. Eds. Stevenson, Angus, and Christine A. Lindberg. : Oxford University Press, . Oxford Reference. Date Accessed Dec. 8, 2022 <https://www.oxfordreference.com/view/10.1093/acref/9780195392883.001.0001/m_en_us1273274>. (Year: 2015).*

Fan et al., Thermal, electrical and mechanical properties of plasticized polymer electrolytes based on PEO/P(VDF-HFP) blends, 2002, Electrochimica Acta, 48, 205-209 (Year: 2002).*

International Search Report dated Nov. 5, 2018.

EU Search Report dated Mach 15, 2018.

Ge Ming-Liang, The Progress of Study of Solid Polymer Electrolytes of PVDFHPF, College of Industrial Equipment and Control Engineering, South China, DOI: 10.16584/j.cnki.issn:1671-5381, 2007.

* cited by examiner

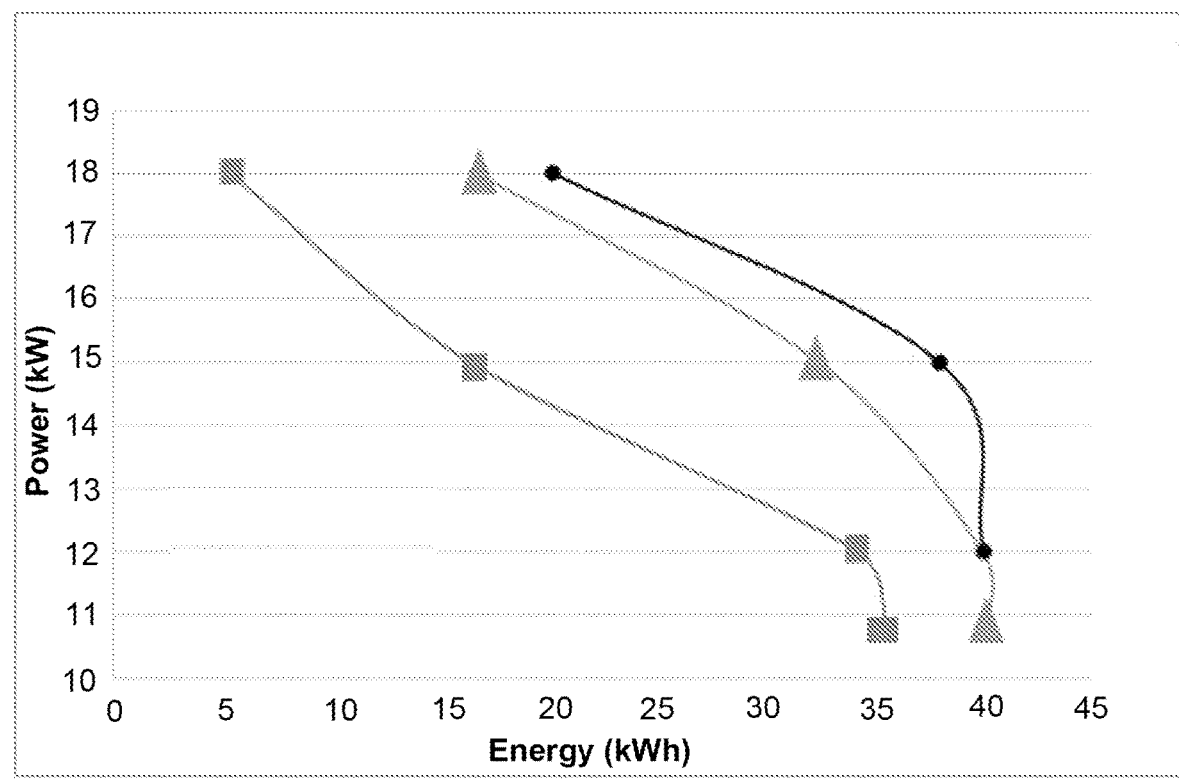

SOLID POLYMER ELECTROLYTE INCLUDING SOLVATING POLYMER, LITHIUM SALT, AND PVDF-HFP COPOLYMER AND BATTERY INCLUDING SAME

RELATED APPLICATION:

This application is a National Phase of PCT/FR2018/052270 filed on Sep. 17, 2018, which claims the benefit of priority from French Patent Application No. 17 58601, the entirety of which are incorporated by reference.

BACKGROUND

Field of the Invention:

The present invention relates to the field of lithium batteries, in particular lithium-metal-polymer (LMP) batteries. It relates more particularly to a solid polymer electrolyte for a battery comprising at least one polymer which solvates the cations of a lithium salt, at least one lithium salt and at least one specifically selected halogenated polymer, and also to the lithium batteries comprising such a solid polymer electrolyte, in particular LMP batteries.

Description of the Related Art:

In general, lithium batteries operate by lithium-ion exchange between an anode and a cathode, through an electrolyte which comprises a lithium salt in solution in a liquid solvent or in a polymer solvent. In the specific case of LMP batteries, the electrolyte is in the form of a solid polymer film comprising at least lithium salt dissolved in a solvating polymer. In addition to the solid polymer electrolyte film, LMP batteries also comprise a positive electrode film applied on a current collector, and also a negative electrode, the film constituting the solid polymer electrolyte being placed between the two films constituting respectively the positive electrode and the negative electrode.

Such a polymer is referred to as solvating if it is capable of solvating the cations of the lithium salt present within the solid polymer electrode film. Polymers consisting essentially of ethylene oxide units (PEO) have been widely used as solvent for lithium salt cations.

However, the mechanical strength conferred by a PEO on the electrolyte film is weak, in particular in the temperature range in which LMP batteries operate. In addition, during the successive operating cycles of the battery, the lithium has a tendency to form dendrites, thereby greatly reducing the life of the battery.

For this reason, LMP batteries generally use a solid polymer electrolyte comprising at least one polymer which solvates the cations of the lithium salt, a lithium salt and a second polymer, which is generally halogenated, in order to give the solid polymer electrolyte film a mechanical strength.

A solid polymer electrode for a battery comprising at least a first polymer capable of solvating a lithium salt, a lithium salt and a second polymer which is at least partially miscible with the first polymer or made at least partially miscible with the first polymer, and in which at least one portion of the second polymer is crystalline or vitreous at the operating temperature of said battery, has for example already been proposed, in particular in patent application US 2009/0162754. As second crystalline polymer, this US patent application mentions polyvinylidere fluoride-co-hexafluoropropylene (PVdF-HFP), and as second vitreous polymer, poly(methyl) methacrylate.

Although the use of such a solid polymer electrolyte gives the electrolyte film mechanical strength, its composition is nevertheless optimized with respect to the overall performance levels of the battery comprising it. Indeed, the electrolyte has an electrical insulator and ion conductor role; it does not directly participate in the electrochemical reactions during the operation of the battery. However, the integration of a non-optimized electrolyte in a battery can cause its performance levels to drop drastically.

However, the increasing development of electric vehicles means that it needs to be possible to provide batteries which have an increasingly high performance level, in terms of power, of energy density and of cyclability.

OBJECTS AND SUMMARY:

For this reason, the objective of the present invention is to provide a solid polymer electrolyte which has both good mechanical strength and an optimized composition so that it can be advantageously used in an LMP battery in order to confer on said battery improved performance levels, in particular high charging powers.

On this occasion, the inventors have developed the solid polymer electrolyte that will be described hereinafter and that constitutes the first subject of the invention.

Consequently, the first subject of the present invention is a solid polymer electrolyte intended to be used in a lithium battery, and also a lithium battery, in particular an LMP battery, comprising such a solid polymer electrolyte.

The solid polymer electrolyte according to the present invention comprises:
- at least one polymer P1 capable of solvating the cations of a lithium salt,
- at least one lithium salt, and
- at least one copolymer P2 of vinylidene fluoride and of hexafluoropropylene (PVdf-HFP), said electrolyte being characterized in that:
  - the hexafluoropropylene content in the copolymer P2 is greater than or equal to 19% by weight relative to the total weight of the copolymer P2;
  - the melting point of said copolymer P2 is greater than or equal to 100° C.

Such a solid polymer electrolyte has an optimized composition in the sense that the presence of copolymer P2 makes it possible not only to improve the mechanical properties of the electrolyte, in particular its elongation at break, but also the electrochemical performance of the battery in which it is used, in particular with high charging powers.

The polymer P1 is preferably chosen from homopolymers and copolymers of ethylene oxide, of methylene oxide, of propylene oxide, of epichlorohydrin and of allyl glycidyl ether. Among such polymers P1, ethylene oxide homopolymers (PEO) are particularly preferred.

The polymer P1 preferably represents from 30 to 70% by weight, and even more preferentially from 45 to 55% by weight, relative to the total weight of the solid polymer electrolyte.

According to one preferred embodiment of the invention, the hexafluoropropylene content in the copolymer P2 ranges from 19 to 50% by weight inclusive, relative to the total weight of said copolymer P2, and even more preferentially from 19 to 30% by weight inclusive.

The melting point of the copolymer P2 preferably ranges from 100° C. to 150° C., and even more preferentially is close to 110-125° C.

According to one most particularly preferred embodiment of the invention, the copolymer P2 comprises 19% by weight of hexafluoropropylene relative to the total weight of said copolymer and has a melting point close to 125° C.

The copolymer P2 preferably represents from 2 to 30% by weight, and even more preferably from 5 to 15% by weight, relative to the total weight of the solid polymer electrolyte.

The lithium salt can in particular be chosen from $LiBF_4$, $LiPF_6$, lithium bis(trifluoromethylsulfonyl)imide (LiTFSI), lithium bis(fluorosulfonyl)imide (LiFSI), bis(pentafluoroethylsulfonyl)imide (LiBETI), $LiAsF_6$, $LiCF_3SO_3$, $LiSbF_6$, $LiSbCl_6$, $Li_2TiCl_6$, $Li_2SeCl_6$, $Li_2B_{10}Cl_{10}$, $Li_2B_{12}Cl_{12}$ and lithium bis(oxalato)borate (LiBOB).

The lithium salt preferably represents from 2 to 20% by weight, and even more preferentially from 5 to 15% by weight, relative to the total weight of the solid polymer electrolyte.

Of course, the solid polymer electrolyte can contain additives conventionally used in solid polymer electrolytes, such as fillers intended to reinforce the mechanical strength. By way of example, mention may be made of MgO, $TiO_2$, $SiO_2$, $BaTiO_3$ or $Al_2O_3$.

The solid polymer electrolyte in accordance with the present invention can advantageously be produced by mixing its various constituents in the appropriate proportions, for example by extrusion, using a single-screw extruder or a twin-screw extruder.

The lithium battery which constitutes the second subject of the present invention comprises a film of a solid polymer electrolyte as defined according to the first subject of the invention, said film being placed between a film constituting a negative electrode and a film constituting a positive electrode, said positive electrode being optionally in contact with a current collector.

In the lithium batteries according to the present invention, the thickness of the films which constitute the various elements of the battery is in general of the order of from 1 to about 100 micrometres. Preferably, the solid polymer electrolyte film has a thickness of from 1 to 50 μm, and preferably from 2 to 20 μm.

According to one preferred embodiment of the invention, the lithium battery is an LMP battery.

In an LMP battery according to the invention, the negative electrode can consist of lithium metal, or of an alloy thereof.

The active material of the positive electrode can be chosen from the vanadium oxides $VO_x$ (2≤x≤2.5), $LiV_3O_8$, $Li_yNi_{1-x}Co_xO_2$, (0≤x≤1; 0≤y≤1), the manganese spinelles $Li_yMn_{1-x}M_xO_2$ (M=Cr, Al, V, Ni, 0≤x≤0.5; 0≤y≤2), organic polydisulfides, FeS, $FeS_2$, iron sulfate $Fe_2(SO_4)_3$, phosphates and phosphosilicates of iron and lithium of olivine structure, or their products of substitution of the iron with manganese, used alone or as mixtures. The collector of the positive electrode is preferably made of aluminium, optionally coated with a carbon-based layer.

BRIEF DESCRIPTION OF THE DRAWINGS:

The sole Figure is a graph showing the power (in kW) as a function of the energy (kWh) from Example 3 in accordance with one embodiment.

DETAILED DESCRIPTION:

The present invention is illustrated by the following examples, to which it is not however limited.

EXAMPLE 1: PREPARATION OF A SOLID POLYMER ELECTROLYTE FILM IN ACCORDANCE WITH THE INVENTION

A solid polymer electrolyte film in accordance with the present invention was prepared, having the following composition by weight:
Polyethylene oxide sold under the trade name POE by the company Aldrich 48%
PVdF-HFP 81/19 sold under the trade name Kynar® superflex 2500 by the company ARKEMA 40%
Lithium bis(trifluoromethylsulfonyl)imide (LiTFSI) sold by the company Aldrich 12%

A solid polymer electrolyte film in accordance with the present invention, the thickness of which was 20 μm (film EPS 1) was thus obtained by extrusion.

EXAMPLE 2: PREPARATION OF COMPARATIVE SOLID POLYMER ELECTROLYTE FILMS

The procedure of example 1 was reproduced, with the PVdF-HFP 81/19 used above in example 1 being replaced with the same amount of a PVdF-HFP 85/15 sold under the trade name Solef® 21510 by the company SOLVAY (film EPS 2), and also with the same amount of a PVdF-HFP 84/16 sold under the trade name Kynar® flex 2751 by the company ARKEMA (film EPS 3).

Each of the films EPS 2 and EPS 3 also have a thickness of 20 μm.

EXAMPLE 3: STUDY OF THE ELECTROCHEMICAL PROPERTIES OF A BATTERY IN ACCORDANCE WITH THE INVENTION CONTAINING THE EPS 1 ELECTROLYTE FILM AND COMPARISON WITH BATTERIES NOT IN ACCORDANCE WITH THE INVENTION COMPRISING THE EPS 2 OR EPS 3 ELECTROLYTE FILMS

In this example, the electrochemical properties of a battery B1 in accordance with the invention comprising the EPS 1 polymer electrolyte film as prepared above in example 1, were compared to those of comparative batteries not in accordance with the invention comprising either the EPS 2 polymer electrolyte film as prepared above in example 2 (battery B2) or the EPS 3 polymer electrolyte film as prepared above in example 2 (battery B3).

In the batteries B1, B2 and B3, the negative electrode is a lithium metal film having a thickness of 30 μm. The positive electrode is a 70 μm film of a composite material placed on a current collector made of aluminium coated with a carbon-based layer, said composite material comprising 70% by weight of $LiFePO_4$ as electrode active material, and also 7% by weight of lithium salt, 2% by weight of carbon and 21% by weight of polymer.

The batteries B1, B2 and B3 respectively were prepared by colaminating the EPS 1, EPS 2 and EPS 3 films respectively, with the lithium film and the film forming the positive electrode.

The initial capacity of each of the batteries B1, B2 and B3 was measured by discharging at low regime (regime equivalent to complete discharge over the course of 10 hours). The charging performance levels of these three batteries was subsequently measured by alternating low-current discharges (C/10) and charges at different regimes.

The corresponding results are given in the appended FIG. 1 in which the power (in kW) is a function of the energy (kWh). In this FIGURE, the curve with the solid circles corresponds to the battery B1 in accordance with the present invention, the curve with the solid triangles corresponds to the comparative battery B2 which is not part of the invention, and the curve with the solid squares corresponds to the comparative battery B3 which is not part of the invention.

These results show notable differences in electrochemical performance levels between the battery B1 in accordance with the present invention, that is to say comprising an EPS 1 solid polymer electrolyte based on a solvating polymer, on a lithium salt and on a PVdf-HFP copolymer P2 in which the hexafluoropropylene content is greater than or equal to 19% by weight relative to the total weight of the copolymer P2, and the batteries B2 and B3 not in accordance with the invention, that is to say comprising respectively an EPS 2 or EPS 3 solid polymer electrolyte in which the PVdf-HFP copolymer comprises respectively only 15% or 16% by weight of hexafluoropropylene. These differences are particularly significant at high powers.

Thus, these results demonstrate that the use of a solid polymer electrolyte in accordance with the invention comprising a PVdF-HFP copolymer P2 in which the hexafluoropropylene content is greater than or equal to 19% by weight relative to the total weight of said copolymer P2 makes it possible to significantly improve the electrochemical performance levels of the battery.

The invention claimed is:

1. A solid polymer electrolyte comprising:
   at least one lithium salt,
   at least one polymer P1 capable of solvating the cations of said lithium salt, and
   at least one copolymer P2 of vinylidene fluoride and of hexafluoropropylene (PVdf-HFP),
   wherein:
   the hexafluoropropylene content in the copolymer P2 is greater than or equal to 19% by weight relative to the total weight of the copolymer P2;
   a melting point of said copolymer P2 is from 110 to 125° C.; and
   wherein the solid polymer electrolyte is in the form of a film having a thickness of from 1 to 50 µm.

2. The solid polymer electrolyte according to claim 1, wherein said solid polymer electrolyte does not comprise a solvent different from said polymer P1.

3. A solid polymer electrolyte comprising:
   at least one lithium salt,
   at least one polymer P1 capable of solvating the cations of said lithium salt, and
   at least one copolymer P2 of vinylidene fluoride and of hexafluoropropylene (PVdf-HFP),
   wherein:
   the hexafluoropropylene content in the copolymer P2 is greater than or equal to 19% by weight relative to the total weight of the copolymer P2;
   a melting point of said copolymer P2 is from 110 to 125° C.; and
   wherein the polymer P1 represents from 30 to 70% by weight, relative to the total weight of the solid polymer electrolyte.

4. The solid polymer electrolyte according to claim 3, wherein the polymer P1 is chosen from homopolymers and copolymers of ethylene oxide, of methylene oxide, of propylene oxide, of epichlorohydrin and of allyl glycidyl ether.

5. The solid polymer electrolyte according to claim 3, wherein the polymer P1 is chosen from ethylene oxide homopolymers.

6. The solid polymer electrolyte according to claim 3, wherein said solid polymer electrolyte does not comprise a solvent different from said polymer P1.

7. The solid polymer electrolyte according to claim 3, wherein the hexafluoropropylene content in the copolymer P2 ranges from 19 to 50% by weight inclusive, relative to the total weight of said copolymer P2.

8. The solid polymer electrolyte according to claim 3, the copolymer P2 represents from 2 to 30% by weight relative to the total weight of the solid polymer electrolyte.

9. The solid polymer electrolyte according to claim 3, the lithium salt is chosen from $LiBF_4$, $LiPF_6$, lithium bis(trifluoromethylsulfonyl)imide, lithium bis(fluorosulfonyl)imide, bis(pentafluoroethylsulfonyl)imide, $LiAsF_6$, $LiCF_3SO_3$, $LiSbF_6$, $LiSbCl_6$, $Li_2TiCl_6$, $Li_2SeCl_6$, $Li_2B_{10}Cl_{10}$, $Li_2B_{12}Cl_{12}$ and lithium bis(oxalato)borate.

10. The solid polymer electrolyte according to claim 3, wherein the lithium salt represents from 2 to 20% by weight relative to the total weight of the solid polymer electrolyte.

11. The solid polymer electrolyte according to claim 3, wherein said solid polymer electrolyte is in the form of a film.

12. The solid polymer electrolyte according to claim 3, wherein said solid polymer electrolyte does not comprise fillers intended to reinforce the mechanical strength.

13. A lithium battery comprising a film of a solid polymer electrolyte, said film being placed between a film constituting a negative electrode and a film constituting a positive electrode, said positive electrode being optionally in contact with a current collector, said battery being characterized in that said solid polymer electrolyte film is a film of the solid polymer electrolyte as defined in claim 3.

14. The lithium battery according to claim 13, wherein the solid polymer electrolyte film has a thickness of from 1 to 50 µm.

15. The lithium battery according to claim 13, wherein said battery is a lithium-metal-polymer battery.

* * * * *